May 29, 1934.  B. S. GROTH ET AL  1,960,812
MANUFACTURE OF FURFURAL
Filed April 30, 1932
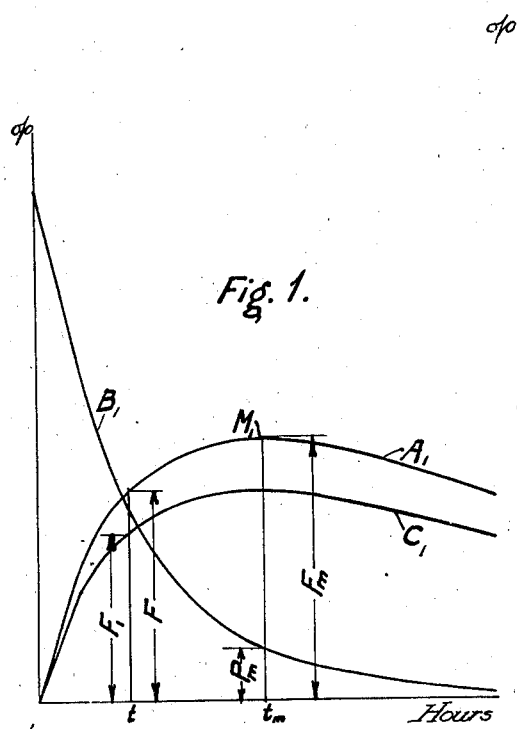
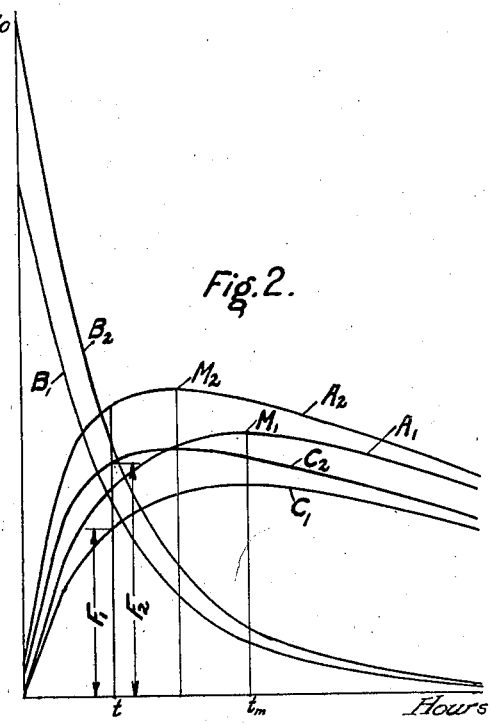
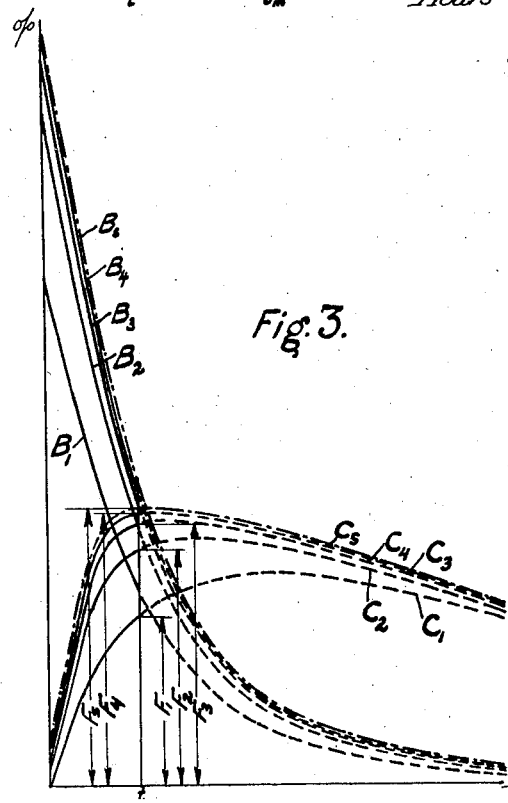
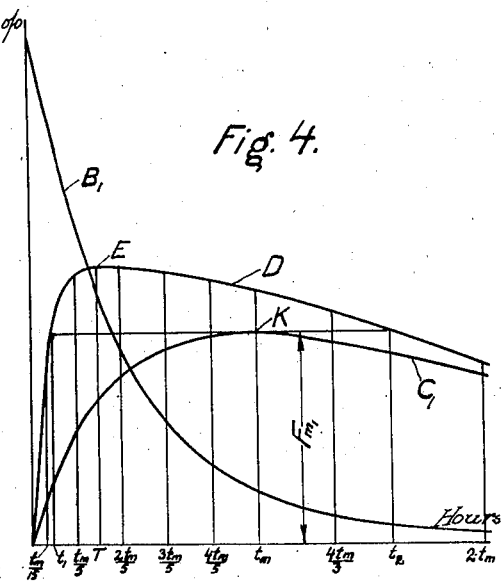
Inventors:
Bertil S. Groth
Georg H. Blomquist Patented May 29, 1934

1,960,812

UNITED STATES PATENT OFFICE 1,960,812

MANUFACTURE OF FURFUR

Bertil Sixten Groth and Georg Henning Blomqvist, Stockholm, Sweden

Application April 30, 1932, Serial No. 608,544
In Sweden October 22, 1931

22 Claims. (Cl. 260—54)

This invention relates to improvements in the manufacture of furfural out of furfural yielding substances.

As raw material can be used any kind of pentosan-containing materials, or solutions containing pentosans or pentoses.

One object of the invention is to develop such methods of treatment that any kind of furfural yielding substances can be used, not only materials in a finely divided or liquid state but also materials in larger or smaller lumps; and further so that a good yield of furfural can be obtained at a low consumption of heat with the use of simple and inexpensive apparatus and accessories. A further object of the invention is to develop methods of treatment that can be specially adapted for treating such pentosan-containing materials that are suitable also for producing a good fibre material, such as wood, in such a way that a good yield of furfural can be obtained and at the san.. ime, as a valuable by-product, a residue that without any further chemical treatment can be used for the production of a technically useful fibre material of good quality.

According to the most important of hitherto published methods for manufacturing furfural, the furfural is distilled off continuously as soon as it is formed, out of fear for the decomposition of the furfural. Two different principal methods of this kind can be distinguished.

According to one of these methods the raw material, oat hulls, is impregnated with a very small quantity of an acid liquid and heated to about 150° centigrade, whereupon the furfural is driven off by means of direct steam as soon as it is formed. The yield of furfural is undoubtedly good, but on account of the high pentose concentration, the transformation of the pentose into other products than furfural will be so large that in spite of the continuous removal of the furfural, the yield thereof will be considerably lower than could be expected. With this method probably only finely divided raw materials can be used. The residue can hardly be used for anything but fuel.

According to the other principal method a comparatively large quantity of liquid in relation to the raw-material is used. Therefore, as the furfural is distilled off continuously as it is formed, very large quantities of steam will be required for the distillation. Further, the escaping vapors will be so diluted that the rectification of the furfural also will consume a very large amount of heat. On account hereof it does not seem that this method can be worked economically.

In difference to older methods the present invention is mainly characterized by two principal features which in different modes of operation can be combined with each other or with other features, either known before or newly developed by us, as described below. One of these two principal features is that the furfural is allowed to continuously accumulate in the solution in which it is formed in spite of the danger of its decomposition. The second principal feature is that the furfural forming reaction is interrupted while the reaction liquid still contains pentoses, and that this pentose-containing liquid, after losses of water and acid or other reactive substances in the reaction liquid having been replaced, is used for treating new raw material in such a way that a steady circulation of pentose-containing reaction liquid will take place in the process.

According to preferred modes of carrying out the invention, the furfural yielding substance is heated with diluted acid solutions of such strength and at such temperature that the decomposition of the furfural will be kept within moderate limits. It is further preferred to use such quantities of reaction liquid that the pentose (pentosan) concentration of said liquid will be comparatively low, thereby avoiding too large transformation of the pentoses into other non-desirable products than furfural. And finally, according to the invention, the heat accumulated in the reaction vessel and its contents is utilized for distilling off accumulated furfural at such periods that the quantity of furfural distilled off by means of said heat will form a considerable part of the total yield of furfural obtained in a single completed operation, thus ensuring a good thermal economy of the process.

A common characteristic of the different modes of the process is that the furfural yielding substance is heated together with a liquid able to develop furfural therewith. This liquid consists preferably of water containing catalyzing agent, which preferably may be hydrogen ions obtained by dissolving suitable acids or salts in said liquid.

The reason why hitherto no technically operative process for manufacturing furfural involving accumulation of furfural in a reaction liquid has been developed, must be the fear for the decomposition of the furfural, and further that the course of the reactions leading to the formation and decomposition of the furfural were kinetically but slightly investigated. Thorough scientific investigations of this kind have been carried out by us, and as a practical result thereof we have been able to determine the limits within which to work in order to further the formation of furfural and limit its decomposition.

If pentosan-containing material is heated with an acid aqueous solution, the pentosans are first hydrolyzed and dissolved as pentoses, which reaction is completed comparatively fast. If the pentoses are heated further with acid solution, they will be transformed into other substances, mainly according to two parallel running reactions, namely:

(a) Pentoses are decomposed into furfural:

$$C_5H_{10}O_5 = C_5H_4O_2 + 3H_2O.$$

(b) From pentoses are directly formed polymerized products. The prime polymerization product is formed by the combination of two pentose molecules:

$$2C_5H_{10}O_5 = X.$$

This product X is a resinaceous product of a more or less dark brown colour. It is difficultly soluble in water but easily soluble in certain organic solvents, such as alcohol and acetone. With rising temperature it is gradually further polymerized into an almost carbon-like product.

When the furfural formed according to reaction (a) is further heated in the acid solution, it is slowly decomposed under the formation of dark coloured products.

We have found that for a certain pentose or pentosan concentration of the acid solution the reaction velocities of the reactions (a) and (b) and the decomposition of the furfural have about the same relation to each other at different temperatures and different hydrogen ion concentrations, provided that the pH of the solution is less than 3. Thus, at an increase of the hydrogen ion concentration or of the temperature, the velocity of all these reactions will increase in about the same proportion. But on the other hand it has proved that the pentose concentration has a deciding influence upon the course of the reactions (a) and (b). Thus, at a very low pentose or pentosan concentration, the reaction (a) will be predominant so that mainly furfural is obtained but only a very small quantity of the polymerization product X. At a high pentose or pentosan concentration the reaction (b) will predominate. In this case a large quantity of the product X will be obtained but only a comparatively small quantity of furfural. It is easy to realize that the reactions must be influenced in the said direction on account of reaction (a) being monomolecular but reaction (b) bimolecular.

The factors by the variation of which the velocity of formation and velocity of decomposition of the furfural can be regulated, are the hydrogen ion concentration of the reaction liquid, the temperature, and the pentose concentration, which latter depends on the quantity of raw material in relation to the quantity of reaction liquid used. The velocity of decomposition of the furfural depends mainly on the hydrogen ion concentration and the temperature, provided that not large quantities of salts, sugar, etc. are present, which increase the velocity of decomposition as well as the velocities of the other two reactions. For a certain hydrogen ion concentration the velocity of decomposition increases with increasing temperature. And for a certain temperature said velocity increases with increasing hydrogen ion concentration.

In order to give an idea about the variation of said velocity of decomposition a few results of our researches on this subject are given below. With the speed of decomposition $h$ is meant the fraction of the total quantity of furfural that in each moment is decomposed according to the differential equation:

$$\frac{df}{dt} = -h \cdot f \quad (1);$$

wherein $f$ is the variable quantity of furfural in a solution of furfural and $t$ is the time. If temperature and hydrogen ion concentration are constant and pH is less than 3, also $h$ must be a constant, as the decomposition of the furfural is a monomolecular reaction for pH below 3, independently of the varying furfural concentration of the solution.

By solving Equation (1) is obtained:

$$f = \frac{f_o}{e^{-ht}} \quad (2);$$

wherein $f_o$ is the quantity of furfural in the solution at the time $t = 0$.

The percentage of the original quantity of furfural $f_o$ that has been decomposed amounts to $$\frac{f_o - f}{f_o} \cdot 100\%$$

Out of Equation (2) is then obtained:

$$\frac{f_o - f}{f_o} \cdot 100 = (1 - e^{-h \cdot t}) \cdot 100\% \quad (3).$$

The table given below contains the observed values of heat, a few different reaction temperatures and varying values of pH of the acid reaction liquid, and further the percentage of the furfural that is decomposed after respectively ½, 1, 2 and 3 hours as calculated by means of the Equation (3).

| Reaction liquid used | Temp. | pH | h | Percentage of decomposition after— | | | |
|---|---|---|---|---|---|---|---|
| | | | | ½ hour | 1 hour | 2 hours | 3 hours |
| 20% $H_2SO_4$ | 104.8 | +0.09 | 0.087 | 4.25 | 8.33 | 16.0 | 23.0 |
| 13, 15% HCl | 107.8 | −0.37 | 0.341 | 15.7 | 29.9 | 49.5 | 64.1 |
| Buffered solution | 150. | +0.25 | 0.73 | 30.6 | 51.8 | 76.8 | 88.8 |
| Do | 150. | +0.73 | 0.229 | 10.8 | 20.5 | 36.75 | 49.7 |
| Do | 150. | +1.18 | 0.065 | 3.2 | 6.3 | 12.2 | 17.7 |
| Do | 150. | +1.55 | 0.0311 | 1.54 | 3.06 | 6.0 | 8.9 |
| Do | 150. | +2.40 | 0.0160 | 0.80 | 1.6 | 3.15 | 4.7 |
| Do | 170. | +0.79 | 0.75 | 31.3 | 52.8 | 77.7 | 89.5 |
| Do | 170. | +1.18 | 0.23 | 10.9 | 20.6 | 36.9 | 49.9 |
| Do | 170. | +1.54 | 0.101 | 4.9 | 9.6 | 18.3 | 26.1 |
| Do | 170. | +2.34 | 0.037 | 1.83 | 3.6 | 7.1 | 10.5 |

The table above shows how widely the decomposition of furfural will vary at different temperatures and hydrogen ion concentrations, but at the same time it makes clear that it is possible to so select said factors that the decomposition will be kept within moderate limits.

An increase of the temperature increases also the velocity of formation of furfural out of pentoses. Too low temperatures will retard the course of reaction and make the lixiviation of the raw material inferior, whereas too high temperatures besides a highly increased decomposition of furfural might cause nondesirable actions upon the raw material, such as injurious decompositions, carbonization and the like. Further, very high temperatures require very high pressures involving expensive equipment and difficult management. When using acids, too low temperatures require a correspondingly increased acid concentration, while otherwise the period of treatment would be too long. When treating materials, the residue of which should be used for producing a fibre material, too concentrated acid solutions should be avoided, as they would cause non-desired decompositions of the raw material. Out of above named reasons it does not seem possible to carry out the process satisfactorily at temperatures lower respectively higher than 100° respectively 200° centigrade.

As set forth above also the hydrogen ion concentration influences the decomposition of furfural. When working at low temperatures, the hydrogen ion concentration must be high, otherwise the necessary time of treatment will be too long. At higher temperatures lower hydrogen ion concentrations (more diluted solutions) can be used for similar reasons (compare the table). If it is desired to produce a useful fibre product, the lignin and cellulose must be saved as much as possible, wherefore too concentrated solutions then should be avoided. It follows as a result of our investigations that the hydrogen ion concentration of the reaction liquid should correspond to a pH between 0 and 4. Outside of these limits it meets with practical difficulties of different kinds to carry out the process.

The above given limits for temperature and pH may seem rather wide, but is the intention to give in the first place an idea about the extreme limits of said factors, within which it on the whole is possible to practice the principle of letting formed furfural accumulate in the reaction vessel in spite of its decomposition. By special investigations we have determined such narrower limits within which said principle can be applied with good advantage, namely a reaction temperature between 130 and 180° centigrade and a pH of the reaction liquid between 0.5 and 2.0.

The reaction liquid may preferably consist of a water solution containing such substances that give hydrogen ions, which latter act as catalyzers, such substances preferably being mineral acids such as sulphuric acid, sulphurous acid, hydrochloric acid, nitric acid and acid salts. Also strong organic acids, such as formic acid, may be used. A diluted solution of sulphuric acid is, however, preferred.

As mentioned above the pentoses will be transformed according to parallel running reactions, partly into furfural, partly into polymerization products. The furfural is formed according to a monomolecular reaction, whereas the latter are formed by polymolecular reactions. The quantity of formed polymerization products per time unit at a certain moment will be an exponential function of the pentose concentration, whereas the quantity of formed furfural only is a linear function of said concentration. If the pentose concentration is increased, the formation of non-desired polymerization products will therefore increase much faster than the formation of furfural. As it seems desirable to obtain as much furfural as possible, the conclusion can then be drawn that so large quantities of reaction liquid as possible should be used. However, too large quantities of liquid should not be used, as the obtained furfural solutions would be too diluted and the process consequently require too large quantities of heat for the recovery of the furfural.

In order to lixiviate the raw material satisfactorily, also comparatively large quantities of liquid are necessary, specially when the raw material occurs in lump form. Comparatively large quantities of liquid have been used according to an older suggested method. As that method, however, was based on distilling off furfural continually as soon as it was formed, the vapors would be too diluted to make a satisfactory economical result possible. Only when working according to our suggested principle of letting furfural accumulate in the reaction until a certain concentration of furfural in the solution has been reached, does it seem economically possible to work with large quantities of liquid.

On account of the varying percentage of furfural yielding components (pentosans) in different raw materials, the quantity of used reaction liquid will be different in different cases. As an upper limit we suggest that the relation between the weight of furfural yielding components counted as pentoses and the weight of the reaction liquid should be less than 0.15. With respect to the lixiviation of the raw material, specially when it occurs in lump form, we further suggest that the weight of the reaction liquid including moisture of the raw material should be at least twice as large as the weight of the dry substance of the raw material.

When the furfural is allowed to accumulate in the solution, the quantity of furfural in the solution will gradually increase. At the same time, however, the quantity of furfural yielding substances is decreasing, wherefore the quantity of new-formed furfural will gradually be lowered. As the furfural quantity increases, the quantity of decomposing furfural will also increase in proportion thereto. Gradually therefore a state is reached when the quantity of new-formed furfural per time unit equals the quantity of decomposing furfural. At this stage the furfural content has reached its maximum. From then on it would begin to decrease if the reaction were allowed to continue. When said maximum is reached a considerable quantity of pentoses is left in the reaction liquid.

According to one mode of operation the furfural forming reaction is interrupted when the concentration of accumulated furfural has reached such a value that it can be economically removed in sufficient quantities. It is suggested according to the invention that the reaction is interrupted and furfural distilled off directly from the reaction vessel within a space of time when the furfural concentration of the solution amounts to at least 50% of the maximum concentration possible to obtain. The point of interruption can be either before or after the maximum. The furfural concentration at this point should not be less than ½% by weight.

We have found that when using oat hulls with 40% pentosans as raw material, with suitable pentose concentration, temperature, and pH of the reaction liquid, the quantity of furfural accumulated in the solution will in one treatment reach a maximum of 13 to 14% of the weight of used oat hulls. It is easy to determine the position of the maximum, and by interrupting the process at or in the neighborhood thereof and removing the furfural from the solution, a very good yield of furfural is obtained. In reality the furfural content changes but very little nearer to said maximum. To remove all of the furfural from the solution would of course require too much heat. It will depend on economic circumstances how large percentage of the accumulated furfural is to be driven off. If for instance 80% is distilled off, such a good yield as 10.5 to 11% of the weight of dry oat hulls was obtained in the cited example.

When letting the furfural accumulate in the solution towards a maximum a very large quantity of the furfural can be distilled off by blowing off the digester, without extra heat, thereby utilizing the heat accumulated in the digester and its contents for this purpose. This depends on the comparatively high furfural concentration obtained when working according to this method. The further quantity of furfural desired to remove must be distilled off by means of additionally supplied heat, for instance direct or indirect steam.

The process can be carried out so that the reaction is allowed to continue at the desired reaction temperature until a suitable concentration of furfural has been reached in the solution, whereupon the top-outlet is opened and the reaction vessel is blown off, whereby the temperature will fall to for instance 110 to 105° centigrade. During this period furfural is distilled off by means of the accumulated heat and no additional heat should then be supplied. The formation of furfural ceases practically when the pressure is released so that the temperature rapidly falls. If the reaction temperature is 150° and the digester is blown off in this way to 105°, between 50 to 60% of the total quantity of furfural in the digester will be distilled off without any extra heat supply. This ensures a low heat consumption. A further quantity of furfural may thereupon be distilled off by means of extra heat, and this distillation can be continued so far as the prices of fuel, furfural etc. economically admit.

Another way of carrying out the process, is to let the reaction continue at reaction temperature in a closed vessel until the concentration of furfural has reached a certain value, for instance at least one half per cent, thereupon open the top-outlet and begin distilling off furfural at about the same furfural forming temperature by increasing the heat supply to the reaction vessel, for instance by means of direct steam. During this distillation period furfural is still being formed. As furfural now is removed continually, it is evident that its decomposition will be somewhat less. Time is also saved as the reaction and the distillation now partly occur simultaneously in the process.

When this distillation has been continued to a desired limit, the heat supply is cut off and the reaction vessel is blown off to about 105° centigrade, thereby utilizing the heat accumulated in said vessel and its contents. In this mode of operation the heat consumption will be somewhat larger than in the first example. However, it is easy to so adapt the periods of distillation to each other that at least 25% of the furfural obtained is distilled off by means of the heat accumulated in the reaction vessel and its contents.

Another alternative when the reaction is carried to an end in a closed reaction vessel, is to first let the digester blow off furfural from the reaction temperature down to about 110 to 105° centigrade against atmospheric pressure, and thereupon connect the digester with a vacuum condenser so that the digester can be blown off down to 70 to 60° centigrade. Thereby no extra heat would be necessary for distilling off furfural and the thermal economy would be correspondingly improved, but practical difficulties in connection with said vacuum distillation would probably make this mode of operation difficult to carry out.

When furfural is allowed to accumulate in the solution, the pentosan (pentose) concentration, reaction temperature and hydrogen ion concentration should preferably be so adapted that if the process is continued towards a maximum concentration of furfural in the solution the same would amount to 1 to 3% of the weight of the solution, depending on the kind of raw material used.

According to above described forms of the invention the possibility of utilizing the used reaction liquid has not been taken into consideration. As the reaction liquid at the maximum of furfural concentration in the same still contains a considerable quantity of pentoses and as all of the furfural in the liquid cannot be removed economically, it would mean a great waste not to utilize the reaction liquid for new treatment of raw material in the same way.

As stated in the introduction of this specification one principal feature of this invention is to interrupt the furfural forming reaction while the reaction liquid still contains pentoses, and use said liquid after replacing losses of acid, water or other reactive substances for treating new raw material so that a steady circulation of pentose-containing reaction liquid will take place in the process.

The circulation of reaction liquid in chemical processes has been practiced before, but it has then only been the question of saving reagents, such as acids or lyes or the like, and not still unconsumed raw material respectively the end product as in this case, when unconsumed furfural yielding substance (pentoses) and furfural are recovered and made to circulate in the process.

When the process is operated with circulating reaction liquid, the furfural forming reaction is interrupted when there still is an appreciable quantity of pentoses left in the reaction liquid. The interruption may be effected by releasing the pressure in the digester, thus blowing off furfural and lowering the temperature. Said interruption should preferably take place when the amount of pentoses in the solution still is at least 10% of the amount at the beginning of the reaction. The reaction liquid is separated from residual material as far as possible. This can be facilitated by pressing, rolling or washing the residual material by means of suitable devices. A very large percentage can be recovered. The furfural may be distilled off before or after said separation, but as already stated above more or less of the furfural must be left in the separated liquid. After replacing occurring losses of acid, water or other reagents, the liquid is used for treating new raw material in the same way. It is supposed that the same quantity of raw material is charged each time and that other reaction conditions always are practically equal and that the furfural forming reaction always is interrupted after the same period of time, the reaction liquid separated and recovered and furfural distilled off in the same proportions each time. Then each new treatment would start with an increased amount of pentoses and free furfural in the solution originating from preceding treatments, wherefore an increase in the amount of free furfural in the digester will have occurred when the reaction is interrupted at the determined moment. This increase will, however, diminish each time and the pentose and furfural concentration will tend towards a maximum which will be attained when the process practically has reached a state of continuance.

In order to better explain these somewhat complicated circumstances, the course of operation has been illustrated by means of diagrams on the accompanying drawing.

Fig. 1 illustrates the relative course of the accumulation of furfural in a digester if the same is charged with a certain quantity of oat hulls and a certain quantity of pentose-free acid reaction liquid with a certain hydrogen ion concentration. The reaction takes place at a certain temperature and is supposed not to be interrupted.

The abscissas indicate the time passed from the beginning of the furfural formation, for instance in hours.

The ordinates of the curve $A_1$ indicate the quantity of free furfural in the solution at different moments, expressed in per cent of the original weight of dry substance in the oat hulls. It reaches its maximum $F_m\%$ after the time $t_m$ hours and then begins to fall.

The ordinates of the curve $B_1$ indicate at different moments the quantity present in the digester of not yet decomposed pentoses and pentosans, the latter calculated as an equivalent quantity of pentoses, the sum being expressed in per cent of the original weight of dry substance in the oat hulls. At the time $t=0$, its value is about 45.5% (40 parts of pentosans being chemically equivalent to 45.5 parts of pentoses) but decreases rapidly and approaches 0 at growing $t$. When the amount of furfural has reached its maximum at $M_1$ a considerable quantity of undecomposed pentoses $P_m$ is still present in the solution.

Out of economic reasons mainly depending on fuel and furfural prices, all of the furfural accumulated in the digester cannot be distilled off. We suppose in this example that the economical limit for distilling off furfural from the digester is 80% of the accumulated furfural.

The ordinates of the curve $C_1$ are 80% of the corresponding ordinates of the curve $A_1$. Thus the curve $C_1$ indicates the quantity of furfural that would be distilled off from the digester, if the reaction was interrupted at different moments and always 80% of the furfural accumulated at that moment were distilled off.

It is now supposed that the reaction is interrupted after $t$ hours and that 80% of the furfural in the digester is distilled off. At that moment there is a quantity of free furfural amounting to $F\%$ of the original weight of the dry oat hulls. The distilled off furfural $=F_1=0.80.F\%$. There is left in the solution a quantity of undecomposed pentoses $=P\%$ of the original weight of dry oat hulls. There is also left in the solution a quantity of free furfural equal to $0.20.F\%$ of the same weight.

It is further supposed that after removing the furfural quantity $F_1$, as much as possible of the solution is separated from the residual material, and that the solution after addition of new acid and some water is used as reaction liquid in a following new treatment to utilize the pentoses and furfural left in the solution. On account of the comparatively large quantities of liquid used according to this method, it is possible when using oat hulls by means of simple pressing devices to recover 90 to 95% of the liquid.

If then in the next operation the same quantity of oat hulls as before is charged, the new operation will start with a larger quantity of furfural yielding substance than the preceding one; and besides there is present a quantity of free furfural that was missing in the first case. If now the curves corresponding to those shown in Fig. 1 are drawn, it is realized that they will run the whole time in a corresponding degree above the curves of reaction of the first operation.

In Fig. 2 are drawn the curves $A_1$, $B_1$ and $C_1$ exactly as in Fig. 1, and in addition the corresponding new curves $A_2$, $B_2$ and $C_2$, showing the course of reaction during the second operation. It is to be noted that the curve $A_2$ indicates the quantity of free furfural at different moments in per cent of the weight of the new charge of oat hulls, which is the same as in the first case. At the time $t=0$ there is already a certain quantity of free furfural originating from the preceding operation. The curve $A_2$ obtains its maximum at a point $M_2$ which is situated above $M_1$ and displaced to the left. The maximum will occur earlier while the pentose concentration now is somewhat higher and therefore the transformation of pentoses in other products than furfural will increase quicker than the increase of the furfural formation. The state of equilibrium between new-forming furfural and decomposing furfural will therefore be reached earlier.

$B_2$ is the new pentose curve which indicates at different moments the quantity of remaining pentoses and pentosans, the latter counted as pentoses, in per cent of the weight of the charge of oat hulls.

In the curve $C_2$ the ordinates are 80% of the corresponding ordinates of the curve $A_2$. Thus the curve $C_2$ indicates the quantity of furfural that would be obtained in the distillate, if the reaction was interrupted at different moments and 80 per cent of the furfural in the solution was distilled off.

If the interruption occurred after the same period of time, $t$ hours, as in the first case, there would be obtained in the distillate a quantity of furfural equal to $F_2\%$ of the weight of charged oat hulls, which latter was equally large both times. $F_2$ is considerably larger than $F_1$.

If it now is proceeded in the same way as before, that is, if the same percentage of the used reaction liquid is recovered and used in the preparation of new reaction liquid of the same hydrogen ion concentration and the same quantity as before, and the new reaction liquid is used for the treatment at the same temperature of a third charge of oats hulls, equally large as the first and second one, new A—, B— and C— curves will be obtained that all the time run above corresponding curves of the second operation. The maximum points of the new B— and C— curves will also be somewhat displaced to the left in relation to the previous curves on account of the still increasing pentose concentration. If the 3rd operation is interrupted after the same period of time, $t$ hours, as before, the same percentage of reaction liquid is recovered and circulated and a 4th, 5th, 6th, etc. operation is carried out in the same way with the same charge of oat hulls, and the reactions always are interrupted after $t$ hours, one finds that the new A—, B— and C— curves will each time be somewhat higher than the previous ones. The maximum points of the B— and C— curves will steadily be moved to the left.

In Fig. 3 the different B— and C—curves for 4 operations are shown, which all have been interrupted after $t$ hours. The dashed part of the curves after $t$ hours indicates how the course of reactions in each case would have continued, had no interruption taken place.

As indicated the quantity of furfural in the distillate increases for each new operation from $F_1$, $F_2$, $F_3$ to $F_4$, in the fourth operation, a per cent of the each time equally large charge of oat hulls. The increases themselves, however, are becoming smaller and smaller each time. The increases are in fact different terms of an indefinitely converging series, the sum of which will form the quantity of furfural in the distillate when a state of equilibrium has been reached. By guidance of the results of our research work regarding the transformation and decomposition of pentoses and furfural we are able concerning raw materials hitherto investigated by us to calculate with a high degree of accuracy the ultimate values of the furfural and pentose quantities in the solution, when a state of continuance has been reached, if the reaction liquid is circulated in the described way, and provided that the percentages of recovered reaction liquid and distilled off furfural, pH of the reaction liquid, temperature of treatment and pentose concentrations are known.

The increases are diminishing so rapidly that already after 5 to 6 operations a state of equilibrium and the maximal yield of furfural practically is reached, if the reaction always is interrupted after the time $t$ hours.

In the same way the pentose quantity that each time is added from a preceding operation will be steadily increased but at the same time approach a limit that is reached at the same time as the limit of the furfural quantity. The same holds true about the quantity of free furfural that by means of the circulating liquid each time is added to the new charge.

In Fig. 3 are shown with dashed and dotted lines the curves $B_s$ and $C_s$ that illustrate the course of reaction when said state of equilibrium has been reached. The quantity of furfural obtained in the distillate is then $F_s$% of the constant weight of the charge of oat hulls, and it is the quantity of furfural that from now on will be obtained out of each new charge, if the reaction always is interrupted after $t$ hours. This value $F_s$ will besides very closely coincide with the maximum point of the curve $C_s$, depending on the above mentioned gradual displacement of said point to the left. In other words, when the state of equilibrium has been reached, the maximum point of the furfural curve will practically be attained after $t$ hours.

If in the same way as above described, the values of $F_s$ at different values of $t$ are obtained, that is by variation of the moment of interruption, and all the time the same percentage of reaction liquid is recovered and allowed to circulate, the same percentage of accumulated furfural each time is distilled off, and other conditions also were unchanged, and the obtained values of $F_s$ were set off as ordinates to the corresponding values of $t$, a curve would be obtained showing the quantity of furfural that, when the state of equilibrium is reached, actually is obtained in the distillate at different moments of interrupting the reaction.

Such a curve D is shown in Fig. 4. The curves $B_1$ and $C_1$ have also been drawn in Fig. 4 on the same scale. The curve D will of course have a maximum, showing the absolutely largest yield of furfural obtainable when the reaction liquid is allowed to circulate in the process as described. Said maximum, which occurs at E, also indicates after what time, T hours, the reaction always should be interrupted in order to reach the highest yield of furfural. The investigations have shown that T for oat hulls is about $\frac{1}{4}$—$\frac{1}{3}$ of $t_m$, the time for reaching the maximum of the curves $A_1$ and $C_1$ in the initial operation, provided that each time 80% of the furfural is distilled off and 85% of the reaction liquid recovered. The value of $t_m$ for different working conditions is easily determined by tests.

According to the investigations on oat hulls, whereupon the curve D in Fig. 4 is based, the yield of furfural was determined after reaching the state of equilibrium when interruptions of the reaction where made after periods of time that in relation to $t_m$ were respectively:

$1/15\ t_m$; $\frac{1}{5}\ t_m$; $\frac{2}{5}\ t_m$; $\frac{3}{5}\ t_m$; $\frac{4}{5}\ t_m$; $t_m$; $1\frac{1}{3}\ t_m$; and $2\ t_m$ hours. The percentage of recovered reaction liquid was in this case only 85% and 80% of the accumulated furfural was distilled off after each ended single operation. The amount of pentosans in the used oat hulls was 40%. The maximum point K on $C_1$ corresponds to a yield of furfural $F_{m1}=10.8\%$ of the weight of the charged oat hulls. The corresponding point on the curve $A_1$ (Fig. 1) shows that the quantity of furfural in the solution at that time was 13.5% of the weight of the oat hulls.

The values of $F_s$ (Fig. 3) obtained at the different points of interruption were in relation to $F_{m1}$ respectively: 0.80 $F_{m1}$; 1.28 $F_{m1}$; 1.31 $F_{m1}$; 1.285 $F_{m1}$; 1.25 $F_{m1}$; 1.205 $F_{m1}$; 1.095 $F_{m1}$; and 0.85 $F_{m1}$.

After the time T hours the maximal yield of furfural in the distillate obtainable in this way was 1.32 $F_{m1}$=about 14.3% of the weight of the oat hulls. The furfural quantity before the distillation was then 17.9% of the weight of oat hulls. With suitable mechanical pressing or rolling devices the percentage of recovered reaction liquid can be considerably increased above the said 85% and the yield correspondingly increased. With said percentage equal to 95%, the maximal yield of furfural should be well above 15% of the weight of oat hulls, when 80% of the furfural is distilled off. Could more furfural be distilled off economically, the yield would be still more increased.

Through the maximum point K on the curve $C_1$ a horizontal line is drawn which cuts the curve D in two points corresponding to the times $t_1$ and $t_2$. Thus, between these two far separated points the reaction may be interrupted and the reaction liquid circulated, but still a larger yield of furfural in the distillate be obtained than corresponds to the furfural yield at the maximum point of the curve $C_1$. The time of reaction can thus be interrupted within a very great interval of time and still a very good yield of furfural be obtained. If for instance to obtain a good fibre material the time of treatment must be adapted with regard thereto, it is realized that the present invention makes this possible without giving a low yield of furfural.

If the main point is to obtain the largest possible yield of furfural, it is evident from the position of the maximum point of the curve D that this is accomplished by interrupting the reaction at a comparatively early stage. This also effects a great gain of time and thus a shorter operation period for the digester. For a plant of a certain capacity correspondingly diminished digesters can be used which make possible a corresponding reduction of necessary spaces and buildings with lowered costs of the plant.

The distillation of the furfural from the reaction vessel, when the reaction liquid is circulated in the way described, may also be carried out in the alternative ways described above. Thus the whole time of reaction may pass with the reaction vessel closed, whereupon furfural first is blown off by releasing the pressure and finally distilled off in the desired way by additionally supplied heat. Or the reaction with a closed digester may be carried to a certain limit, whereupon the outlet is opened and the distillation is started by means of additionally supplied heat so that the temperature in the digester during this period of distillation is practically maintained and new furfural still is formed in the digester. When this distillation has been continued to a desired degree, further furfural is blown off by releasing the pressure and utilizing only the heat accumulated in the digester and its contents. In this way a certain gain of time and a somewhat lowered decomposition of furfural with increased yield of furfural is obtained but at the cost of somewhat increased heat consumption.

The method of circulating the reaction liquid as described above can also be combined with the known method of distilling off the furfural all the time continuously as soon as it is formed. This distillation takes place at furfural forming temperature. The reaction is even then interrupted while still an appreciable quantity of pentoses is left in the solution, whereupon further furfural is removed by releasing the pressure in the digester. When the state of equilibrium is reached, a considerably higher concentration of furfural in the distilled off vapours is obtained than in older methods working with a continual removal of the furfural. In the same way as when furfural was accumulated in the solution, the actual furfural yield corresponding to different points of interruption can be determined and thus a curve obtained corresponding to the curve D in Fig. 4.

According to a special mode of combining the principles of circulating the reaction liquid and accumulating furfural in the solution, no additional heat is supplied to the digester for distilling purposes so that only the heat accumulated in the digester and its contents is used for these purposes. Thus, when the determined point of interruption is reached, the outlet of the digester is opened and the furfural is blown off until the temperature of the digester has fallen to 105 to 100°. In this way 50 to 60% of the accumulated furfural can be distilled off. No further distillation from the digester takes place. Said distillation can as an alternative be carried out by connecting the digester with a vacuum condenser and continuing the distillation down to 60 to 70° centigrade.

A considerably increased quantity of furfural will now be left and consequently more furfural will be lost by the losses of reaction liquid and by decomposition in the following treatments, but nevertheless a surprisingly high yield of furfural is obtained. If this mode is adopted in the example illustrated in Fig. 4, and other conditions were unchanged, the maximum yield of furfural would amount to about 13% of the weight of charged oat hulls. The maximum point will be reached earlier and the time of treatment correspondingly shortened. A lower yield of furfural is obtained but in compensation an exceedingly low heat consumption per pound of furfural and a shortened time of operation. Which mode is to be adopted of all the aforementioned ones, and how far the distillation of the furfural should be continued, will for an already existing plant depend on the prevailing prices of used raw material, fuel and furfural.

It appears thus in what a high degree the described method of manufacturing furfural can be modified to meet varying market conditions without any changes of the plant.

The invention also embraces that modification when the reaction liquid either before or after blowing off the digester is removed and separated from the residual material, whereupon furfural is distilled off in a second step. This mode of operation can of course be combined with the described method of circulating reaction liquid still containing pentoses and the most favourable point of interruption can be determined in the same way as indicated above.

When using pentosan-containing material in lump form, such as wood chips, the pentosans will not be extracted as quickly as when using more finely divided material such as oat hulls. The reaction curves will therefore be somewhat in arrear of the corresponding curves for oat hulls on the drawing. The time necessary to reach the maximum yield of furfural will be somewhat longer, whether the reaction liquid is circulated or not. But in other respects the course of reaction will be similar to that of oat hulls, although said materials as being poorer in pentosans will give a much lower yield of furfural. Instead they are excellent raw materials for producing as a by-product a good fibre material without any further chemical treatment, thus giving a compensation for the lower yield of furfural.

Together with furfural also smaller quantities of other substances, mainly acetic acid and methanol are obtained in the distillate. When using oat hulls these quantities are small, but when using wood they occur in such quantities that it is profitable to utilize at least the methanol. Before further rectifying the obtained furfural distillate, the organic acids should be neutralized, for instance by means of lime. The methanol is easily separated from the furfural in a suitable rectifying apparatus. The methanol is obtained at a very low cost in a comparatively pure state and high concentration. When using birch wood the quantity of methanol obtained is 10–15% of the weight of the furfural.

When using wood as raw material the same will after the treatment be enough softened so as to be easily defibrated in a hollander, kollergang or the like. The treatment can be so conducted that the lignin and the cellulose is saved to a large extent, whereby the value of the product as a fibre material is increased. By working with comparatively large quantities of liquid the quantity of precipitated dark polymerization and condensation products is lessened. They are precipitated mainly on the outside of the wood chips. Therefore when the material has been defibrated and washed its colour will become comparatively light.

The fibre material can be used for the manufacture of card-board, insulating plates and for other purposes.

We claim:—

1. Process for producing furfural comprising heating furfural yielding substance with a liquid able to develop furfural therewith; using so much liquid that the weight of furfural yielding components of the used substance is less than 15% of the weight of said liquid; allowing formed furfural to accumulate in the solution; and then distilling off furfural directly from the reaction vessel.

2. Process for producing furfural comprising heating pentosan-containing material with a liquid able to develop furfural therewith; using a quantity of liquid that together with the moisture of the used material is at least twice as large as the weight of the dry substance of the used material; allowing formed furfural to accumulate in the liquid; and then distilling off furfural directly from the reaction vessel.

3. Process for producing furfural comprising heating furfural yielding substance with a liquid able to develop furfural therewith; allowing formed furfural to accumulate in the liquid until the furfural content has reached at least ½% by weight; then distilling off furfural directly from the reaction vessel at furfural forming temperature; and thereupon distilling off further furfural from the reaction vessel by releasing the pressure.

4. Process for producing furfural comprising heating furfural yielding substance with a liquid able to develop furfural therewith; using so much liquid that the weight of furfural yielding components of the used substance is less than 15% of the weight of said liquid; allowing formed furfural to accumulate in the liquid; distilling off furfural directly from the reaction vessel, partly by means of heat accumulated in the reaction vessel and its contents, partly by means of additionally supplied heat; and adapting said periods of distillation so that at least 25% of the total yield of furfural obtained in a single completed operation is distilled off by means of said accumulated heat.

5. Process for producing furfural comprising heating pentosan-containing material with a liquid able to develop furfural therewith; using a quantity of liquid that together with the moisture of the used material is at least twice as large as the weight of the dry substance of the used material; allowing formed furfural to accumulate in the liquid; distilling off furfural directly from the reaction vessel, partly by means of heat accumulated in the reaction vessel and its contents, partly by means of additionally supplied heat; and adapting said periods of distillation so that at least 25% of the total yield of furfural obtained in a single completed operation is distilled off by means of said accumulated heat.

6. Process for producing furfural comprising heating furfural yielding substance with a liquid able to develop furfural therewith; interrupting the furfural forming reaction while still an appreciable quantity of pentoses is left in the liquid; and using said pentose containing liquid for preparing new reaction liquid for the treatment of a new charge of furfural yielding substance in the same way.

7. Process for producing furfural comprising heating furfural yielding substance with a liquid able to develop furfural therewith; interrupting the furfural forming reaction while still a quantity of pentoses is left in the liquid amounting to at least 10% of the original quantity of pentoses and pentosans, the latter counted as pentoses; and using said pentose containing liquid for preparing new reaction liquid for the treatment of a new charge of furfural yielding substance in the same way.

8. Process for producing furfural comprising heating furfural yielding substance with a liquid able to develop furfural therewith; distilling off furfural directly from the reaction vessel; interrupting the furfural forming reaction while still an appreciable quantity of pentoses is left in the liquid; and using said pentose containing liquid for preparing new reaction liquid for the treatment of a new charge of furfural yielding substance in the same way.

9. Process for producing furfural comprising heating furfural yielding substance with a liquid able to develop furfural therewith; allowing formed furfural to accumulate in the liquid; distilling off furfural directly from the reaction vessel; interrupting the furfural forming reaction while still an appreciable quantity of pentoses is left in the liquid; and using said pentose containing liquid for preparing new reacton liquid for the treatment of a new charge of furfural yielding substance in the same way.

10. Process for producing furfural comprising heating furfural yielding substance with a liquid able to develop furfural therewith; distilling off furfural directly from the reaction vessel at furfural forming temperature; interrupting the furfural forming reaction while still an appreciable quantity of pentoses in left in the liquid; and using said pentose containing liquid for preparing new reaction liquid for the treatment of a new charge of furfural yielding substance in the same way.

11. Process for producing furfural comprising heating furfural yielding substance with a liquid able to develop furfural therewith; allowing formed furfural to accumulate in the liquid until the furfural content has reached at least ½% by weight; then distilling off furfural directly from the reaction vessel at furfural forming temperature; interrupting the furfural forming reaction and distilling off further furfural by releasing the pressure in the reaction vessel while still an appreciable quantity of pentoses is left in the liquid; and using said pentose containing liquid for preparing new reaction liquid for the treatment of a new charge of furfural yielding substance in the same way.

12. Process for producing furfural comprising heating furfural yielding substance with a liquid able to develop furfural therewith; distilling off furfural directly from the reaction vessel; interrupting the furfural forming reaction while still a quantity of pentoses is left in the liquid amounting to at least 10% of the original quantity of pentoses and pentosans, the latter counted as pentoses; and using said pentose containing liquid for preparing new reaction liquid for the treatment of a new charge of furfural yielding substance in the same way.

13. Process for producing furfural comprising heating furfural yielding substance with a liquid able to develop furfural therewith; allowing formed furfural to accumulate in the liquid; distilling off furfural directly from the reaction vessel; interrupting the furfural forming reaction while still a quantity of pentoses is left in the liquid amounting to at least 10% of the original quantity of pentoses and pentosans, the latter counted as pentoses; and using said pentose containing liquid for preparing new reaction liquid for the treatment of a new charge of furfural yielding substance in the same way.

14. Process for producing furfural comprising heating furfural yielding substance with a liquid able to develop furfural therewith; distilling off furfural directly from the reaction vessel at furfural forming temperature; interrupting the furfural forming reaction while still a quantity of pentoses is left in the liquid amounting to at least 10% of the original quantity of pentoses and pentosans, the latter counted as pentoses; and using said pentose containing liquid for preparing new reaction liquid for the treatment of a new charge of furfural yielding substance in the same way.

15. Process for producing furfural comprising heating furfural yielding substance with a liquid able to develop furfural therewith; allowing formed furfural to accumulate in the liquid until the furfural content has reached at least ½% by weight; then distilling off furfural directly from the reaction vessel at furfural forming temperature; interrupting the furfural forming reaction and distilling off further furfural by releasing the pressure in the reaction vessel while still a quantity of pentoses is left in the liquid amounting to at least 10% of the original quantity of pentoses and pentosans, the latter counted as pentoses; and using said pentose containing liquid for preparing new reaction liquid for the treatment of a new charge of furfural yielding substance in the same way.

16. Process for producing furfural comprising heating furfural yielding substance with an acid aqueous solution; interrupting the furfural forming reaction while still an appreciable quantity of pentoses is left in the liquid; and using said pentose containing liquid for preparing new reaction liquid for the treatment of a new charge of furfural yielding substance in the same way.

17. Process for producing furfural comprising heating furfural yielding substance with a diluted aqueous solution of sulphuric acid; interrupting the furfural forming reaction while still an appreciable quantity of pentoses is left in the liquid; and using said pentose containing liquid for preparing new reaction liquid for the treatment of a new charge of furfural yielding substance in the same way.

18. Process for producing furfural comprising heating furfural yielding substance with an acid aqueous solution having a hydrogen ion concentration corresponding to a pH between 0 and 4; interrupting the furfural forming reaction while still an appreciable quantity of pentoses is left in the liquid; and using said pentose containing liquid for preparing new reaction liquid for the treatment of a new charge of furfural yielding substance in the same way.

19. Process for producing furfural comprising heating furfural yielding substance with an acid aqueous solution having a hydrogen ion concentration corresponding to a pH between 0.5 and 2.0 at a temperature between 130 and 180° centigrade; interrupting the furfural forming reaction while still an appreciable quantity of pentoses is left in the liquid; and using said pentose containing liquid for preparing new reaction liquid for the treatment of a new charge of furfural yielding substance in the same way.

20. Process for producing furfural comprising heating furfural yielding substance with a liquid able to develop furfural therewith; using so much liquid that the weight of furfural yielding components of the used substance is less than 15% of the weight of said liquid; interrupting the furfural forming reaction while still an appreciable quantity of pentoses is left in the liquid; and using said pentose containing liquid for preparing new reaction liquid for the treatment of a new charge of furfural yielding substance in the same way.

21. Process for producing furfural comprising heating pentosan-containing material with a liquid able to develop furfural therewith; using a quantity of liquid that together with the moisture of the used material is at least twice as large as the weight of the dry substance of the used material; interrupting the furfural forming reaction while still an appreciable quantity of pentoses is left in the liquid; and using said pentose containing liquid for preparing new reaction liquid for the treatment of a new charge of furfural yielding substance in the same way.

22. Process for producing furfural comprising heating furfural yielding substance with a liquid able to develop furfural therewith; allowing formed furfural to accumulate in the liquid; interrupting the furfural forming reaction while still an appreciable quantity of pentoses is left in the liquid; distilling off furfural by releasing the pressure in the reaction vessel and without any additional heat supply; and using the liquid still containing pentoses and furfural for preparing new reaction liquid for the treatment of a new charge of furfural yielding substance in the same way.

BERTIL SIXTEN GROTH.
GEORG HENNING BLOMQVIST.